P. F. LANDPHERE.
Cultivator.

No. 160,602. Patented March 9, 1875.

WITNESSES:
C. Neveux
A. F. Terry

INVENTOR:
Perry F. Landphere
BY
ATTORNEYS.

UNITED STATES PATENT OFFICE.

PERRY F. LANDPHERE, OF MAZON, (MORRIS P. O.,) ILLINOIS, ASSIGNOR TO HIMSELF AND DELOSS JONES, OF SAME PLACE.

IMPROVEMENT IN CULTIVATORS.

Specification forming part of Letters Patent No. 160,602, dated March 9, 1875; application filed January 18, 1875.

*To all whom it may concern:*

Figure 2:
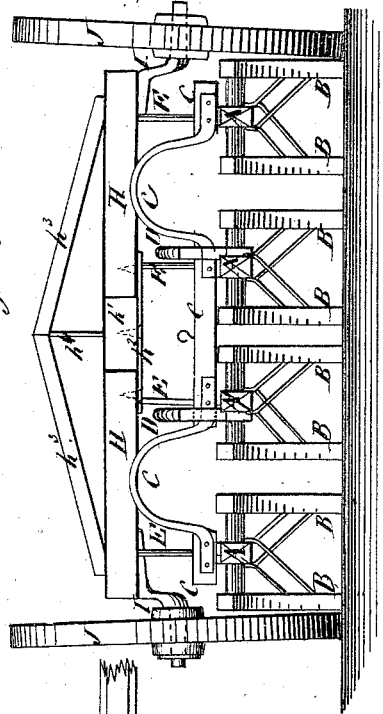
Figure 4:
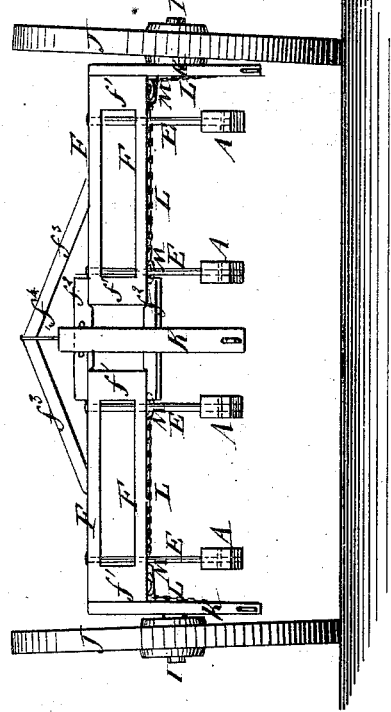
Figure 1:
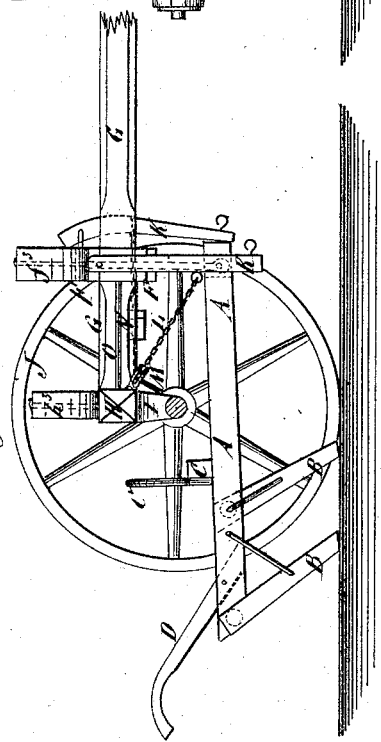
Figure 3:
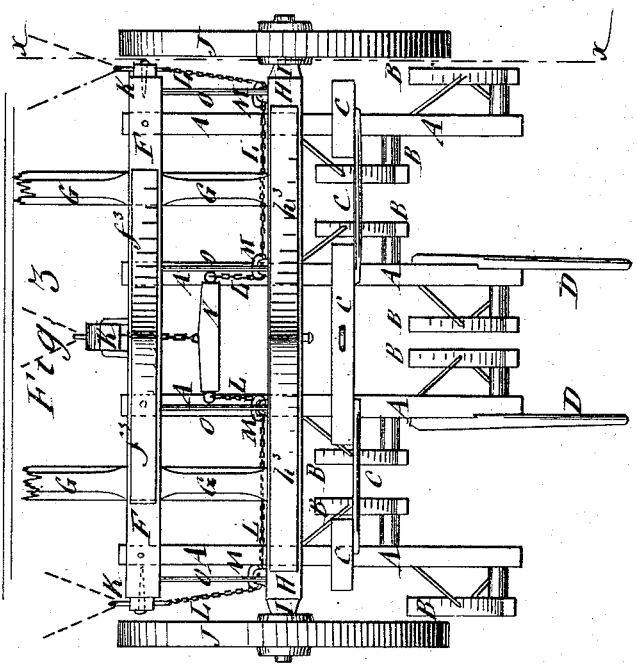

Be it known that I, PERRY F. LANDPHERE, of Mazon, (Morris P. O.,) in the county of Grundy and State of Illinois, have invented a new and useful Improvement in Cultivators, of which the following is a specification:

Figure 1 is a side view of my improved cultivator, partly in section, through the line $xx$, Fig. 3. Fig. 2 is a rear view of the same. Fig. 3 is a top view of the same. Fig. 4 is a front view of the same.

Similar letters of reference indicate corresponding parts.

My invention has for its object to furnish an improved cultivator, simple in construction and convenient in use, being easily guided and controlled, which shall be so constructed as to cultivate two rows at a time, and which can be readily adjusted to cultivate a single row, or for use as one or two single-row cultivators.

The invention consists in the combination of the two tongues, the cross-bars connected by the bars, braces, and stay-bolt, the two axles connected together by the block, bar or plate, braces, and stay-bolt, the crank-axle arms, and the wheels, to adapt the machine for use as a three-horse two-row cultivator, or as one or two two-horse single-row cultivators; in the combination of the pivoted draft-bars, the ropes or chains, and the guide-pulleys and evener, with the cross-bars and the axles; and in the combination of the cross-bar, having its end parts curved or arched, with the two pairs of beams, as hereinafter fully described.

A are four plow-beams, to each of which are attached two plow-standards, B. The forward standards B of each pair of beams A are placed upon the inner sides of said beams A, and the rear standards are placed upon the outer sides of said beams, as shown in Fig. 3. The beams A are placed at such a distance apart that the row of plants may pass between the forward standards B of each pair of beams A. The beams A are connected and held in their proper relative positions by a cross-bar, C, the end parts of which that pass over the space between the beams of each pair are arched, so as to pass over the plants without injuring them. To the rear end of the inner beam of each pair is attached a handle, D, for convenience in guiding and controlling the plows. The forward end of each beam A is pivoted to the lower end of a rod, E. The upper ends of the rods E pass up through and are secured to the two cross-bars, F, attached to the upper and lower sides of the two tongues G. The ends of the cross-bars F are held at the proper distance apart by having blocks $f^1$ interposed between them. The adjacent ends of the two pairs of bars F are connected together by the short bars $f^2$ attached to them, and the connection is strengthened by the inclined braces $f^3$ and the stay-bolt $f^4$. The rear ends of the two tongues G are attached to the axles H, to the outer ends of which are attached the crank-axle arms I, upon which the wheels J revolve. The adjacent ends of the axles H are connected by the block $h^1$ interposed between them, and by the bar or plate $h^2$ attached to them, and the connection is strengthened by the inclined braces $h^3$ and the stay-bolt $h^4$. To the outer ends of the upper bars F, and to the center of the upper connecting-bar $f^2$, are pivoted the upper ends of the draft-bars K, to the lower ends of which are attached hooks for the attachment of the draft. To the side draft-bars K are attached the ends of two ropes or chains, L, which pass around guide-pulleys M attached to the axles H. The inner ends of the ropes or chains L are attached to the ends of the evener N, which is connected at its center with the middle draft-bar K enough nearer its pivoting-point than the points of attachment of the ropes or chains L to the side draft-bars K are to their pivoting points to equalize the draft among three horses. The cross-bars F and axles H are connected and strengthened by the rods O. As thus described, the cultivator is designed to be drawn by three horses, and to cultivate two rows of plants at the same time. By detaching the bars $f^2 h^2$, braces $f^3 h^3$, and cross-bar C, attaching the crank-axle arm I to the inner end of the axle H, and a side draft-bar, K, to the inner end of the cross-bar F, to receive the inner end of the rope or chain L, and attaching the other handle D to the outer beam A, a two-horse single-row cultivator will be produced.

By having two extra wheels and crank-axles, two extra draft-bars, and two extra handles, the machine may be adjusted as two two-horse single-row cultivators when desired.

Having thus described my invention, what I claim as new, and desire to secure by Letters Patent, is—

1. The combination of the two tongues G, the cross-bars F, connected by the bars $f^2$, braces $f^3$, and stay-bolt $f^4$, the two axles H connected together by the block $h^1$, bar or plate $h^2$, braces $h^3$, and stay-bolt $h^4$, the crank-axle arms I, and the wheels J, to adapt the machine for use as a three-horse two-row cultivator, or as one or two two-horse single-row cultivators, substantially as herein shown and described.

2. The combination of the pivoted draft-bars K, the ropes or chains L, the guide-pulleys M, and the evener N, with the cross-bars F and the axles H, substantially as herein shown and described.

3. The combination of the cross-bar C, having its end parts curved or arched with the two pairs of beams A, substantially as herein shown and described.

PERRY F. LANDPHERE.

Witnesses:
F. W. TUPPER,
I. H. WILSON.